United States Patent [19]

Yamazaki et al.

[11] Patent Number: 5,368,763
[45] Date of Patent: Nov. 29, 1994

[54] LOW POWER LOSS MN-ZN FERRITES

[75] Inventors: Masakatsu Yamazaki; Tetsu Narutani; Hideaki Kobiki, all of Chiba, Japan

[73] Assignee: Kawasaki Steel Corporation, Japan

[21] Appl. No.: 140,362

[22] Filed: Oct. 20, 1993

Related U.S. Application Data

[60] Continuation of Ser. No. 896,407, Jun. 10, 1992, abandoned, which is a division of Ser. No. 662,425, Feb. 28, 1991, Pat. No. 5,143,638.

[30] Foreign Application Priority Data

Mar. 30, 1990 [JP] Japan .................................... 2-50828

[51] Int. Cl.$^5$ ............................................. C04B 35/38
[52] U.S. Cl. ................ 252/62.59; 252/62.62; 252/62.63
[58] Field of Search ............... 232/62.59, 62.62, 62.63

[56] References Cited

U.S. PATENT DOCUMENTS

| | | | |
|---|---|---|---|
| 3,106,534 | 10/1963 | Akashi et al. | 252/62.59 |
| 3,481,876 | 12/1969 | Hiraga et al. | 252/62.62 |

FOREIGN PATENT DOCUMENTS

| | | | |
|---|---|---|---|
| 58-114401 | 7/1983 | Japan | 252/62.62 |
| 61-42104 | 2/1986 | Japan | 252/62.59 |
| 63-62206 | 3/1988 | Japan | 252/62.59 |
| 1052455 | 6/1963 | United Kingdom | 252/62.62 |

*Primary Examiner*—Jack Cooper
*Attorney, Agent, or Firm*—Austin R. Miller

[57] ABSTRACT

A low power loss Mn-Zn ferrite consists essentially of $Fe_2O_3$, MnO and ZnO at a given mole ratio and contains given amounts of $SiO_2$, CaO, niobium oxide and titanium oxide or antimony oxide as trace additives. This ferrite is suitable as a transformer material for switched mode power supply.

1 Claim, 1 Drawing Sheet

5,368,763

LOW POWER LOSS MN-ZN FERRITES

This application is a continuation of application Ser. No. 07/896,407, filed Jun. 10, 1992, now abandoned which is a divisional of U.S. application Ser. No. 07/662,425, filed Feb. 28, 1991, now U.S. Pat. No. 5,143,638.

BACKGROUND OF THE INVENTION

1. Field of the Invention

This invention relates to a low power loss Mn-Zn ferrite suitable for use in power applications.

2. Related Art Statement

So-called Mn-Zn ferrites are widely used as a core material of coil or transformer in various communication machinery and equipment, power supplies and the like. Recently, with the spreading of office automation equipment, they are used as a transformer material of switched mode power supply operated at a high frequency region of about 100 kHz.

For these applications, many characteristics such as high saturation magnetic flux density, high permeability and low power loss are required of Mn-Zn ferrites. In the transformer for the switched mode power supply aiming at the invention, a power loss characteristic under a high magnetic field is most important.

For this end, it has hitherto been attempted no improve these properties by adding various trace components to Mn-Zn ferrite.

For instance, Japanese Patent laid open No. 58-15037 discloses the addition of $Nb_2O_5$ and also Japanese patent laid open No. 60-132301 discloses the addition of $Nb_2O_5$, CaO, $SiO_2$, $V_2O_5$, $ZrO_2$, $Al_2O_3$, $SnO_2$, CuO, CoO and the like, whereby it is attempted to improve the power loss at 100 kHz which is a standard operational frequency at the present, and as a result a power loss at 100 kHz and 200 mT of about 300–350 mW/cm$^3$ has been attained at the present.

SUMMARY OF THE INVENTION

It is an object of the invention to provide Mn-Zn ferrites capable of largely reducing the power loss when being used in a transformer for switched mode power supply by further improving the power loss to 300–350 mW/cm$^3$ at 100 kHz and 200 mT.

According to a first aspect of the invention, there is the provision of a low power loss Mn-Zn ferrite consisting essentially of 52–54.5 mol % of $Fe_2O_3$, 33–40 mol % of MnO and 6–14 mol % of ZnO and containing 0.005–0.040 wt % of $SiO_2$, 0.02–0.20 wt % of CaO, 0.01–0.08 wt % of niobium oxide and 0.05–0.40 wt % of titanium oxide.

According to a second aspect of the invention, there is the provision of a low power loss Mn-Zn ferrite consisting essentially of 52–54.5 mol % of $Fe_2O_3$, 33–40 mol % of MnO and 6–14 mol % of ZnO and containing 0.005–0.040 wt % of $SiO_2$, 0.02–0.20 wt % of CaO, 0.01–0.08 wt % of niobium oxide and 0.005–0.08 wt % of antimony oxide.

DESCRIPTION OF THE PREFERRED EMBODIMENTS

Figure 1:
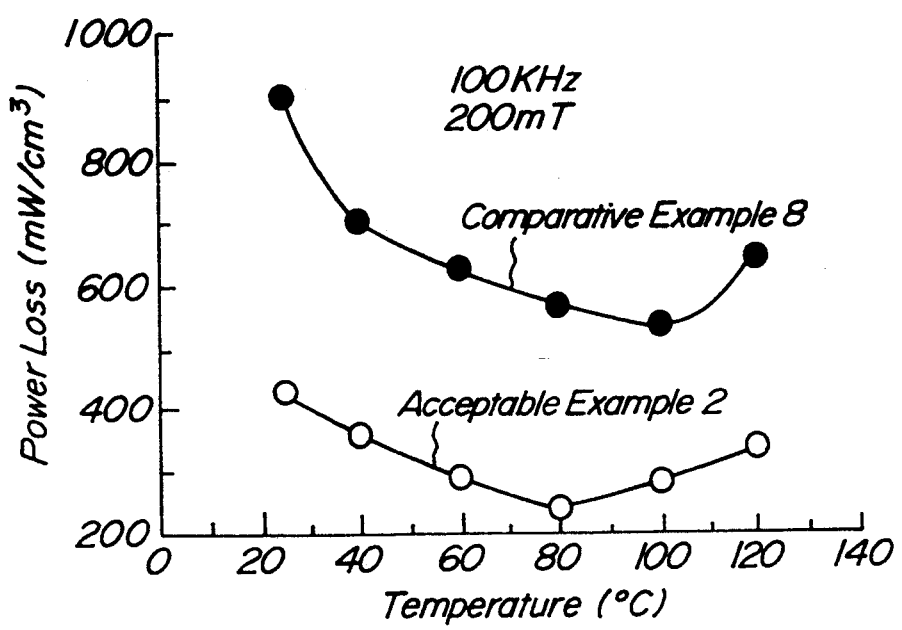
FIG. 1 is a graph showing a temperature dependency of power loss in an Mn-Zn ferrite according to the invention compared to the conventionally commercial product.

At first, the reason why the mole ratios of the basic components composed of $Fe_2O_3$, MnO and ZnO according to the invention are limited to the above ranges will be described below.

The operating temperature of the transformer for switched mode power supply is usually 60°–70° C., so that it is desirable that the power loss is low within above temperature range and also has a negative temperature dependency over a temperature region ranging from room temperature to about 80°–120° C. exceeding the operating temperature. As a result of examination on mole ratio of $Fe_2O_3$, MnO and ZnO from this viewpoint, the range of $Fe_2O_3$: 52–54.5 mol %, MnO: 33–40 mol % and ZnO: 6–14 mol % is obtained.

According to the invention, $SiO_2$, CaO, niobium oxide and titanium oxide or antimony oxide are added as trace components to the above basic components. In this case, the amounts of these trace components are as follows.

$SiO_2$: 0.005–0.040 wt %

$SiO_2$ effectively contributes to increase the specific resistivity of the grain boundary and reduce the eddy current loss together with CaO. However, when the amount is less than 0.005 wt %, the addition is not effective, while when it exceeds 0.040 wt %, abnormal grain growth tends to occur during the sintering and the magnetic properties become unstable. Therefore, the amount is limited to a range of 0.005–0.040 wt %.

CaO: 0.02–0.20 wt %

CaO is a component useful for effectively increasing the grain boundary resistivity together with $SiO_2$ to lead to low eddy current loss. When the amount is less than 0.02 wt %, the effect of increasing the grain boundary resistivity is poor, while when it exceeds 0.20 wt %, the eddy current loss becomes reversely large. Therefore, the amount is limited to a range of 0.02–0.20 wt %.

Niobium oxide: 0.01–0.08 wt %

Niobium oxide (mainly $Nb_2O_5$) effectively contributes to reduce the power loss in a high frequency range. Although the reason why the power loss is improved by the addition of niobium oxide is not yet clear, it is considered that the grain boundary phase giving a high resistivity which mainly consists of a composite phase of $SiO_2$ and CaO is modified by niobium oxide and the magnetically bad influence due to the presence of different phase in the grain boundary is mitigated. However, when the amount is less than 0.01 wt %, the effect is poor, while when it exceeds 0.08 wt %, the abnormal grain growth tends to occur during the sintering. Therefore, the amount is limited to a range of 0.01–0.08 wt %.

Titanium oxide: 0.05–0.40 wt %

Titanium oxide (mainly $TiO_2$) is effective to promote reoxidation of the grain boundary at the cooling step after the sintering step to thereby increase the specific resistivity and reduce the power loss in the high frequency range. When the amount is less than 0.05 wt %, the effect is less, while when it exceeds 0.40 wt %, the power loss rather increases. Therefore, the amount is limited to a range of 0.05–0.40 wt %.

Antimony oxide: 0.005–0.08 wt %

Antimony oxide (mainly $Sb_2O_3$) also improves the power loss by adding together with $SiO_2$, CaO and $Nb_2O_5$. It is considered that the similar effect as in the addition of niobium oxide is obtained by segregation of antimony oxide onto the grain boundary. This effect becomes larger in the coexistence with $SiO_2$ and CaO and further $Nb_2O_5$. However, when the amount is less than 0.005 wt %, the addition effect is less, while when it exceeds 0.08 wt %, the power loss rather increases. Therefore, the amount is limited to a range of 0.005–0.08 wt %.

As mentioned above, the increase of the specific resistivity is very effective for reducing the power loss in the high frequency range around 100 kHz. According to the invention, this object is attained by adding niobium oxide and further titanium oxide or antimony oxide in the presence of $SiO_2$ and CaO and uniformly dispersing them into the grain boundary. There is no problem even if titanium oxide and antimony oxide are simultaneously added together with $SiO_2$, CaO and niobium oxide.

The ferrites according to the invention may be produced according to the usual manner.

That is, iron oxide, manganese oxide and zinc oxide are mixed so that 52–54.5 mol % of $Fe_2O_3$, 33–40 mol % of MnO and 6–14 mol % of ZnO are contained in a final ferrite composition and then 0.005–0.040 wt % of $SiO_2$, 0.02–0.20 wt % of CaO, 0.01–0.08 wt % of niobium oxide (as $Nb_2O_5$) and further at least one of 0.05–0.40 wt % of titanium oxide (as $TiO_2$) and 0.005–0.08 wt % of antimony oxide (as $Sb_2O_3$) are added as trace additives thereto to obtain a starting material. These trace additives can be added even after calcination, that is, at the time of pulverizing.

Then, this starting material is calcined at a temperature of not lower than 800° C., and subsequently is finely pulverized, press formed and sintered at a high temperature of not lower than 1250° C. in a nitrogen gas having a controlled oxygen concentration.

As the iron oxide, use may be made of $Fe_2O_3$, FeO, $Fe_3O_4$ and compounds capable of converting into $Fe_2O_3$ through sintering such as iron hydroxide, iron oxalate and the like. As the manganese oxide, use may be made of MnO, $MnO_2$, $Mn_3O_4$ and compounds capable of converting into MnO through sintering such as manganese carbonate, manganese oxalate and the like. As the zinc oxide, use may be made of ZnO and compounds capable of converting into ZnO through sintering such as zinc carbonate, zinc oxalate and the like.

The following examples are given in illustration of the invention and are not intended as limitations thereof.

EXAMPLE 1

Raw materials were mixed so as to have a final composition of $Fe_2O_3$: 53.5 mol %, MnO: 34.5 mol % and ZnO: 12 mol % and then calcined in air at 900° C. for 3 hours. To the calcined product were added $SiO_2$, CaO (as $CaCO_3$), $Nb_2O_5$ and $TiO_2$ in an amount shown in Table 1, which was pulverized and mixed in a wet-type ball mill. To the finely pulverized powder was added polyvinyl alcohol (PVA) as a binder, which was shaped into a toroidal core having an outer diameter of 36 mm, an inner diameter of 24 mm and a height of 12 mm. This core was sintered at 1320° C. in a nitrogen gas having a controlled oxygen partial pressure for 3 hours.

The power losses of the thus sintered cores were measured at a frequency of 100 kHz, an induction of 0.2 T and a temperature of 80° C. by means of an alternating current BH loop tracer to obtain results as shown in Table 1.

TABLE 1

|  | $SiO_2$ (wt %) | CaO (wt %) | $Nb_2O_5$ (wt %) | $TiO_2$ (wt %) | Power loss (mW/cm³) |
|---|---|---|---|---|---|
| Acceptable Example 1 | 0.0085 | 0.035 | 0.017 | 0.25 | 270 |
| Acceptable Example 2 | 0.014 | 0.035 | 0.017 | 0.25 | 230 |
| Acceptable Example 3 | 0.037 | 0.024 | 0.015 | 0.25 | 245 |
| Acceptable Example 4 | 0.015 | 0.13 | 0.03 | 0.25 | 285 |
| Acceptable Example 5 | 0.015 | 0.07 | 0.03 | 0.25 | 240 |
| Acceptable Example 6 | 0.015 | 0.07 | 0.01 | 0.25 | 265 |
| Acceptable Example 7 | 0.015 | 0.07 | 0.05 | 0.25 | 270 |
| Acceptable Example 8 | 0.015 | 0.05 | 0.07 | 0.25 | 290 |
| Acceptable Example 9 | 0.017 | 0.05 | 0.02 | 0.07 | 295 |
| Acceptable Example 10 | 0.017 | 0.05 | 0.02 | 0.15 | 250 |
| Acceptable Example 11 | 0.017 | 0.05 | 0.02 | 0.37 | 290 |
| Comparative Example 1 | 0.004 | 0.04 | 0.02 | 0.20 | 465 |
| Comparative Example 2 | 0.042 | 0.04 | 0.02 | 0.20 | 860 |
| Comparative Example 3 | 0.012 | 0.01 | 0.02 | 0.20 | 390 |
| Comparative Example 4 | 0.012 | 0.22 | 0.03 | 0.25 | 410 |
| Comparative Example 5 | 0.012 | 0.04 | — | 0.20 | 390 |
| Comparative Example 6 | 0.012 | 0.04 | 0.09 | 0.20 | 370 |
| Comparative Example 7 | 0.016 | 0.04 | 0.03 | 0.03 | 325 |
| Comparative Example 8 | 0.016 | 0.04 | 0.03 | 0.48 | 530 |

As seen from Table 1, in all of the cores according to the invention containing given amounts of $SiO_2$, CaO, $Nb_2O_5$ and $TiO_2$ as trace additives, the low power loss of less than 300 mW/cm³ is achieved.

On the contrary, in the cores containing the trace components at amounts outside the ranges according to the invention, the effect of improving the power loss is less, and in worst case, the power loss is reversely deteriorated due to the abnormal grain growth.

In FIG. 1 are shown results measured on the temperature dependency of power loss in Acceptable Example 2 and Comparative Example 8, from which it is understood that the temperature dependency of power loss is small in the acceptable example as compared with the comparative example over a full operating temperature range.

EXAMPLE 2

Raw materials were mixed so as to have a final composition of $Fe_2O_3$: 52.7 mol %, MnO: 34.6 mol % and ZnO: 12.7 mol % and then calcined in air at 900° C. for 3 hours. To the calcined product were added $SiO_2$, CaO (as $CaCO_3$), $Nb_2O_5$ and $Sb_2O_3$ in an amount shown in Table 2, which was pulverized and mixed in a wet ball mill. To the finely pulverized powder was added PVA as a binder, which was shaped into toroidal cores having an outer diameter of 36 mm, an inner diameter of 24 mm and a height of 12 mm. These cores were sintered at 1320° C. in a nitrogen gas having a controlled oxygen partial pressure for 3 hours.

The power losses of the thus sintered cores were measured at a frequency of 100 kHz, an induction of 200 mT and a temperature of 80° C. by means of an alternating current BH loop tracer to obtain results as shown in Table 2.

TABLE 2

|  | SiO$_2$ (wt %) | CaO (wt %) | Nb$_2$O$_5$ (wt %) | Sb$_2$O$_3$ (wt %) | Power loss (mW/cm$^3$) |
| --- | --- | --- | --- | --- | --- |
| Acceptable Example | | | | | |
| 1 | 0.0084 | 0.035 | 0.015 | 0.04 | 255 |
| 2 | 0.015 | 0.035 | 0.015 | 0.04 | 240 |
| 3 | 0.038 | 0.035 | 0.015 | 0.04 | 290 |
| 4 | 0.013 | 0.025 | 0.02 | 0.02 | 275 |
| 5 | 0.013 | 0.18 | 0.04 | 0.02 | 295 |
| 6 | 0.014 | 0.06 | 0.01 | 0.03 | 260 |
| 7 | 0.014 | 0.06 | 0.07 | 0.01 | 290 |
| 8 | 0.015 | 0.06 | 0.05 | 0.006 | 295 |
| 9 | 0.013 | 0.06 | 0.01 | 0.07 | 270 |
| Comparative Example | | | | | |
| 10 | 0.0047 | 0.04 | 0.02 | 0.02 | 915 |
| 11 | 0.044 | 0.04 | 0.02 | 0.02 | 765 |
| 12 | 0.017 | 0.01 | 0.02 | 0.01 | 320 |
| 13 | 0.017 | 0.06 | 0.02 | 0.03 | 335 |
| 14 | 0.015 | 0.06 | — | 0.02 | 345 |
| 15 | 0.015 | 0.06 | 0.09 | 0.02 | 310 |
| 16 | 0.014 | 0.06 | 0.04 | — | 325 |
| 17 | 0.018 | 0.06 | 0.03 | 0.04 | 315 |

As mentioned above, according to the invention, Mn-Zn ferrites having a considerably low power loss under a high magnetic field as compared with the conventional ferrites can be provided as a core of a transformer for switched mode power supply at a high frequency of about 100 kHz.

What is claimed is:

1. A Mn-Zn having a low power loss and consisting essentially of 52–54.5 mol % of Fe$_2$O$_3$, 33–40 mol % of MnO and 6–14 mol % of ZnO and containing 0.005–0.040 wt % of SiO$_2$, 0.02–0.20 wt % of CaO,) 0.01–0.08 wt % of Nb$_2$O$_5$, 0.005–0.080 wt % of Sb$_2$O$_3$ and 0.05–0.40 wt % of TiO$_2$.

* * * * *

UNITED STATES PATENT AND TRADEMARK OFFICE
CERTIFICATE OF CORRECTION

PATENT NO. : 5,368,763
DATED : November 29, 1994
INVENTOR(S) : Masakatsu Yamazaki et al It is certified that error appears in the above-indentified patent and that said Letters Patent is hereby corrected as shown below:

Column 6, line 18, after "Mn-Zn" insert --ferrite--; and
line 21, please change "CaO,)" to --CaO,--.

Signed and Sealed this

Fifth Day of September, 1995

Attest:

BRUCE LEHMAN

Attesting Officer

Commissioner of Patents and Trademarks